(12) United States Patent
Henderson et al.

(10) Patent No.: US 10,179,518 B2
(45) Date of Patent: Jan. 15, 2019

(54) POWER DOCKING PORT SYSTEM WITH TETRAHEDRAL CHARGING PROBE

(71) Applicants: Ricky Jay Henderson, Graham, WA (US); Aaron Nathaniel Henderson, Lakewood, WA (US)

(72) Inventors: Ricky Jay Henderson, Graham, WA (US); Aaron Nathaniel Henderson, Lakewood, WA (US)

( * ) Notice: Subject to any disclaimer, the term of this patent is extended or adjusted under 35 U.S.C. 154(b) by 0 days.

(21) Appl. No.: 15/525,565

(22) PCT Filed: Nov. 13, 2015

(86) PCT No.: PCT/US2015/060570
§ 371 (c)(1),
(2) Date: May 9, 2017

(87) PCT Pub. No.: WO2016/077690
PCT Pub. Date: May 19, 2016

(65) Prior Publication Data
US 2017/0334302 A1 Nov. 23, 2017

Related U.S. Application Data

(60) Provisional application No. 62/079,741, filed on Nov. 14, 2014.

(51) Int. Cl.
*H01M 10/46* (2006.01)
*B60L 11/18* (2006.01)
(Continued)

(52) U.S. Cl.
CPC ....... *B60L 11/1818* (2013.01); *B60L 11/1816* (2013.01); *B60L 11/1827* (2013.01);
(Continued)

(58) Field of Classification Search
CPC ................................ H02J 7/355; H02J 7/0042
(Continued)

(56) References Cited

U.S. PATENT DOCUMENTS

| 4,553,000 A | 10/1985 | Appleton |
| 5,264,776 A | 11/1993 | Hulsey |

(Continued)

OTHER PUBLICATIONS

International Application No. PCT/US2015/06570, International Search Report, dated Feb. 1, 2016.
(Continued)

*Primary Examiner* — Edward Tso
(74) *Attorney, Agent, or Firm* — George A. Leone; Citadel Patent Law

(57) ABSTRACT

A power docking port system includes a charging probe having a substantially tetrahedral shape with multiple sides and a base portion, each of the multiple sides having a surface. A first set of contacts is embedded into the charging probe and each of the contacts extends radially outwardly from the base portion disposed at a predetermined angle from the others. A second set of contacts are individually mounted onto a different one of the multiple sides so as to conform with its surface. A port is adapted for use in current charging of electronic vehicles wherein the port is constructed to mate with the charging probe and the port includes a mating contact for each of the contacts on the charging probe. The port further includes an interface connector located at an output end of the port for electrically coupling with external power lines and other circuits.

25 Claims, 12 Drawing Sheets

(51) Int. Cl.
*H02J 7/00* (2006.01)
*H01M 10/44* (2006.01)

(52) U.S. Cl.
CPC ......... *B60L 11/1838* (2013.01); *H01M 10/44* (2013.01); *H02J 7/0027* (2013.01)

(58) Field of Classification Search
USPC ................ 320/104, 107, 108, 109, 114, 115; 439/34, 118, 145, 147, 374, 378
See application file for complete search history.

(56) References Cited

U.S. PATENT DOCUMENTS

| | | | |
|---|---|---|---|
| 5,350,312 | A | 9/1994 | Kuno et al. |
| 5,462,439 | A | 10/1995 | Keith |
| 5,498,948 | A | 3/1996 | Bruni et al. |
| 5,674,086 | A | 10/1997 | Hashizawa et al. |
| 6,123,569 | A | 9/2000 | Fukushima et al. |
| 6,334,354 | B2 | 1/2002 | Vaughn et al. |
| 7,963,793 | B2 | 6/2011 | Poulin et al. |
| 8,206,171 | B2 | 6/2012 | Osawa et al. |
| 8,500,476 | B2 | 8/2013 | Hori et al. |
| 8,506,315 | B2 | 8/2013 | Canedo et al. |
| 8,523,596 | B2 | 9/2013 | Inoue et al. |
| 8,529,273 | B2 | 9/2013 | Maegawa |
| 8,569,993 | B2 | 10/2013 | Wolfien |
| 8,700,224 | B2 | 4/2014 | Mathiowetz |
| 8,784,124 | B2 | 7/2014 | Yeon |
| 8,882,525 | B2 | 11/2014 | Mori et al. |
| 8,932,072 | B2 | 1/2015 | Tamaki et al. |
| 8,975,864 | B2 | 3/2015 | Kim |
| 9,102,240 | B2 | 8/2015 | Poulsen |
| 9,106,015 | B2 | 8/2015 | Ohmura |
| 9,132,742 | B2 | 9/2015 | Dai et al. |
| 2009/0007412 | A1 | 1/2009 | Wang et al. |
| 2011/0037429 | A1 | 2/2011 | DeBoer et al. |
| 2011/0171850 | A1 | 7/2011 | Brown, II |
| 2012/0235639 | A1 | 9/2012 | Hamauzu |
| 2012/0326663 | A1 | 12/2012 | You et al. |
| 2013/0049972 | A1 | 2/2013 | Pusch et al. |
| 2014/0060920 | A1 | 3/2014 | Tamaoki et al. |
| 2014/0322952 | A1 | 10/2014 | Ohmura |
| 2014/0326663 | A1 | 11/2014 | Olesen |
| 2014/0329400 | A1 | 11/2014 | Kakizaki et al. |
| 2014/0354229 | A1 | 12/2014 | Zhao et al. |
| 2014/0357113 | A1 | 12/2014 | Fehler et al. |
| 2015/0011111 | A1 | 1/2015 | Toratani et al. |
| 2015/0037994 | A1 | 2/2015 | Nakajima |
| 2015/0054461 | A1 | 2/2015 | Mueller et al. |
| 2015/0069970 | A1 | 3/2015 | Sarkar et al. |

OTHER PUBLICATIONS

International Application No. PCT/US2015/06570, Written Opinion, dated Feb. 1, 2016.

POWER DOCKING PORT SYSTEM WITH TETRAHEDRAL CHARGING PROBE

CROSS-REFERENCE TO RELATED APPLICATIONS

This application is related to and claims priority from U.S. Provisional Application No. 62/079,741 to Henderson filed 14 Nov. 2014 and entitled "POWER DOCKING PORT SYSTEM," the disclosure of which is incorporated by reference.

TECHNICAL FIELD

The present invention relates to charging systems for electric vehicles. More particularly, the invention relates to a system and method for docking an electronic vehicle to a charging port.

BACKGROUND

As reported by the US Department of Energy, the true revival of the electric vehicle didn't happen until around the start of the 21st century. It is generally believed that one of two events sparked the interest seen today in electric vehicles. The first turning point many have suggested was the introduction of the Toyota Prius® hybrid automobile. Released in Japan in 1997, the Prius® hybrid automobile became the world's first mass-produced hybrid electric vehicle. In 2000, the Prius® hybrid automobile was released worldwide, and it became an instant success with celebrities, helping to raise the profile of the car. To make the Prius® hybrid automobile a reality, Toyota used a nickel metal hydride battery—a technology that was supported by the Energy Department's research.

The other event that helped reshape electric vehicles was the announcement in 2006 that a small Silicon Valley startup, Tesla Motors, would start producing a luxury electric sports car that could go more than 200 miles on a single charge. Tesla's announcement and subsequent success spurred many big automakers to accelerate work on their own electric vehicles. In late 2010, the Chevy Volt® and the Nissan LEAF® electric automobiles were released in the U.S. market. The first commercially available plug-in hybrid, the Volt has a gasoline engine that supplements its electric drive once the battery is depleted, allowing consumers to drive on electric for most trips and gasoline to extend the vehicle's range. In comparison, the LEAF® automobile is an all-electric vehicle (often called a battery-electric vehicle, an electric vehicle or just an EV for short), meaning it is only powered by an electric motor.

Over the next few years, other automakers began rolling out electric vehicles in the U.S.; yet, consumers were still faced with one of the early problems of the electric vehicle—where to charge their vehicles on the go. Through the Recovery Act, the Energy Department invested more than $115 million to help build a nation-wide charging infrastructure, installing more than 18,000 residential, commercial and public chargers across the country. Automakers and other private businesses also installed their own chargers at key locations in the U.S., bringing today's total of public electric vehicle chargers to more than 8,000 different locations with more than 20,000 charging outlets.

At the same time, new battery technology—supported by the Energy Department's Vehicle Technologies Office— began hitting the market, helping to improve a plug-in electric vehicle's range. In addition to the battery technology in nearly all of the first generation hybrids, the Department's research also helped develop the lithium-ion battery technology used in the Volt® automobile. More recently, the Department's investment in battery research and development has helped cut electric vehicle battery costs by 50 percent in the last four years, while simultaneously improving the vehicle batteries' performance (meaning their power, energy and durability). This in turn has helped lower the costs of electric vehicles, making them more affordable for consumers.

Many charging systems have been proposed and others are currently being marketed to serve the burgeoning need for providing energy to the ever growing numbers of electric cars. For example, US patent application publication number 20140354229 proposes a vehicle charging station that includes a track configured to extend across a plurality of vehicle parking spaces and a movable charging apparatus supported by the track. There are numerous other types of locking electric vehicle charging connector systems both proposed and currently available.

Existing charging systems include inductive charging devices and rotating magnetic pairs. Unfortunately, there are several drawbacks to these known systems including inefficiencies as related to direct contact, weight and size, and interference due to strong magnetic fields produced by the chargers. Further, they do not offer bi-directional support, thereby eliminating the desirable possibility of grid sharing, power backup (as for a grid failure), or any other function that would require the movement of current from the vehicle or equipment to the port attached structure.

Further still, none of the currently known designs provide a safe and easy guided connection to a charging port. Most are cumbersome at best with several connectors that must be carefully aligned by hand with a mating charging port. The novel system disclosed herein for the first time features a universal method for connecting for charging integral with parking. It will transfer power with current up to about 1000 amps at voltage up to about 1000 volts.

BRIEF SUMMARY OF THE DISCLOSURE

This summary is provided to introduce, in a simplified form, a selection of concepts that are further described below in the Detailed Description. This summary is not intended to identify key features of the claimed subject matter, nor is it intended to be used as an aid in determining the scope of the claimed subject matter.

A power docking port system includes a charging probe having a substantially tetrahedral shape with multiple sides and a base portion, each of the multiple sides having a surface. A first set of contacts is embedded into the charging probe and each of the contacts extends radially outwardly from the base portion disposed at a predetermined angle from the others. A second set of contacts are individually mounted onto a different one of the multiple sides so as to conform with its surface. A port is adapted for use in current charging of electronic vehicles wherein the port is constructed to mate with the charging probe and the port includes a plurality of mating contacts for individually coupling with each of the contacts on the charging probe. The port further includes an interface connector located at an output end of the port for electrically coupling with external power lines and other circuits.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

Figure 1:
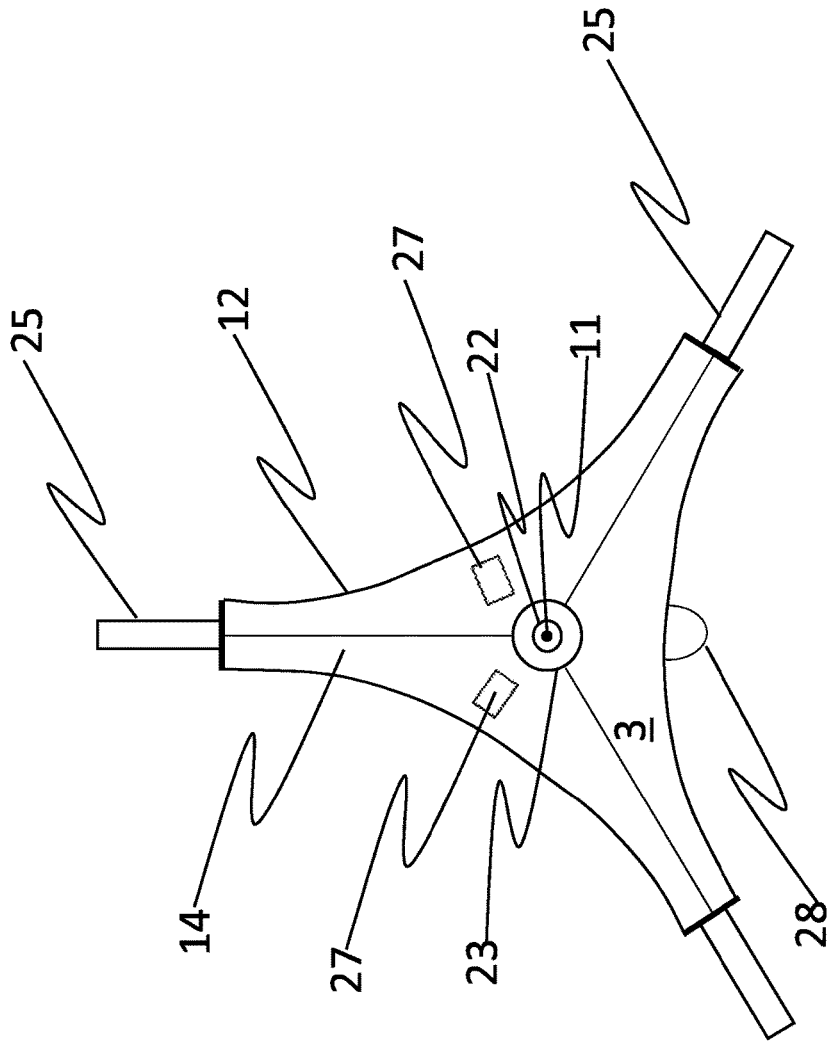
FIG. 1 schematically shows a top view of an example of a charging probe.

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

DETAILED DESCRIPTION OF THE PREFERRED EMBODIMENTS

The following disclosure describes a charging method and system for charging electronic vehicles. Several features of methods and systems in accordance with example embodiments are set forth and described in the figures. It will be appreciated that methods and systems in accordance with other example embodiments can include additional procedures or features different than those shown in the figures. Example embodiments are described herein with respect to a negatively curved tetrahedron probe. However, it will be understood that these examples are for the purpose of illustrating the principles, and that the invention is not so limited.

Definitions

Generally, as used herein, the following terms have the following meanings, unless the use in context dictates otherwise:

The use of the word "a" or "an" when used in conjunction with the term "comprising" in the claims or the specification means one or more than one, unless the context dictates otherwise. The term "about" means the stated value plus or minus the margin of error of measurement or plus or minus 10% if no method of measurement is indicated. The use of the term "or" in the claims is used to mean "and/or" unless explicitly indicated to refer to alternatives only or if the alternatives are mutually exclusive. The terms "comprise", "have", "include" and "contain" (and their variants) are open-ended linking verbs and allow the addition of other elements when used in a claim.

Reference throughout this specification to "one example" or "an example embodiment," "one embodiment," "an embodiment" or combinations and/or variations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

"Communication" as used herein means electronic and/or digital communication among people, computers, electronic devices and systems and may be visual, wireless, or wired or any combination of these.

"Electrically coupled" or "coupled" as used herein with respect to electrical circuits or components means joining components, wires, conductors and other media for the purpose of transferring electromagnetic energy and/or current by hard wiring, wirelessly, optically, through electronic components or inductively via electromagnetic fields.

"Port" as used herein means an electrical connector that may be connected to a grid or have power supplied from some other source.

"Tetrahedron" is used in its generally accepted meaning which is a polyhedron composed of four triangular faces, six straight edges, and four vertex corners.

"Negatively curved tetrahedron" as used herein means a tetrahedron wherein the triangular faces have inwardly curved sides, such triangles are sometimes called anti-Euclidean negatively curved triangles.

"Vehicle" may be any power consumer which may or may not have a power storage device. Note that throughout this disclosure reference to the flow of power may be reversed for any practical purpose, as, for example, grid balancing.

Referring to FIG. 1, a top view of an example of a charging probe is schematically shown. A charging probe 10 includes a substantially polygonal shape with multiple sides 12 and a base portion (as shown below), and each of the multiple sides 12 has a surface 14. The charging probe 10 may advantageously comprise an insulating body 3 symmetrically constructed around a central axis 11. A central contact 22 may optionally be partially embedded in the insulating body 3, aligned along the central axis 11 and project through a top center location or apex region 23 where all of the sides converge.

In one example the length of the insulating body 3 may advantageously be about 5.5 inches as measured along the central axis 11 and comprise thermosetting insulating resin or the like. The optional contact 22 may, for example, be adapted to be electrically coupled to an electrical ground voltage potential. A first plurality of electrical contacts 25 are embedded into the charging probe 10 wherein each of the first plurality of contacts 25 extends radially outwardly disposed at a predetermined angle from the others. A second set of contacts 27 are mounted onto different side surfaces 14. Each of the second set of contacts may advantageously be affixed to conform to the mounting surface. In most useful configurations, the second set of contacts comprises two contacts, each mounted on a different side surface. A third side surface may be used for keying the orientation of the probe.

In one useful example, a top portion of the charging probe 10 may comprise a tetrahedron, and, in another example, a negatively curved tetrahedron. The negatively curved tetrahedron shape is advantageous in that it allows easy alignment of the probe and port from various angles and lateral positions of approach. Due to the curvature of both probe and port surfaces when the probe is inserted into the port it slides easily into the proper position without the need for alignment to a precise angle of attack as would be needed for more squared off polygonal shapes. It is certainly easier to install than currently available connectors which include plugs and pins that must be precisely aligned and installed with some force to overcome metal to metal resistance.

Figure 2:
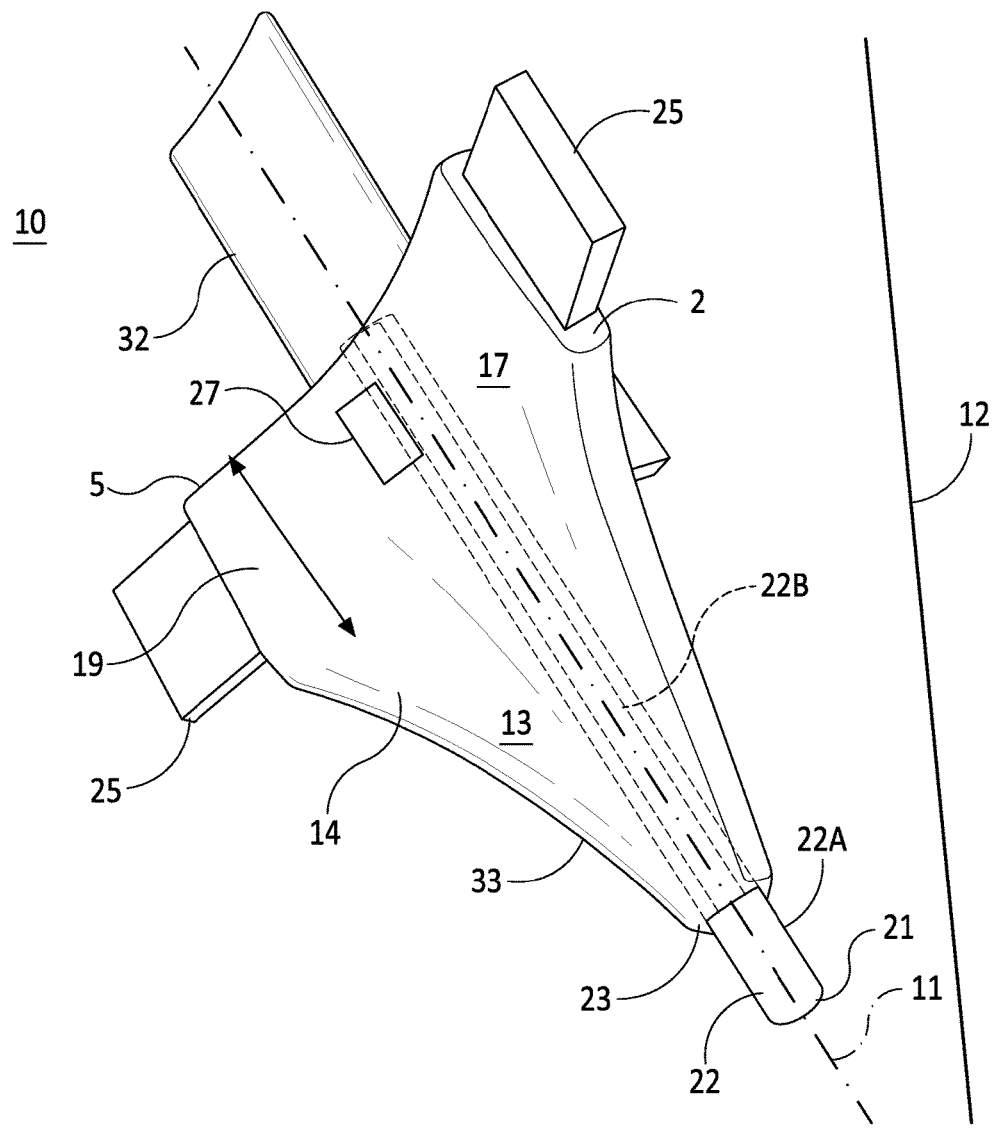
FIG. 2 schematically shows a perspective side view of an example of a charging probe.

Still referring to FIG. 1, a tab 28 may optionally be included to provide an alignment mechanism such as, for example, an orientation key for the probe and corresponding key slot (not shown) on the port. The key slot may be an aperture sized to accept the tab to assure proper alignment of the port and probe electrical contacts. In one example, the orientation key may be a ¼ inch block with rounded corners attached to a bottom face 17 (as shown in FIG. 2) of the probe 10 from the extreme rear of the insulating body structure forward 1 inch. Thus two faces 17 will have the communications electrical contacts 27 and one the orientation key 28. A corresponding key slot 37 in the locking ring (as shown schematically in FIG. 4) may be slightly larger so as to avoid binding would be located between the two lower slots 35 of the locking ring and in the main body of the port if needed extending about $1\frac{1}{8}^{th}$ inch, in one example.

Figure 7:
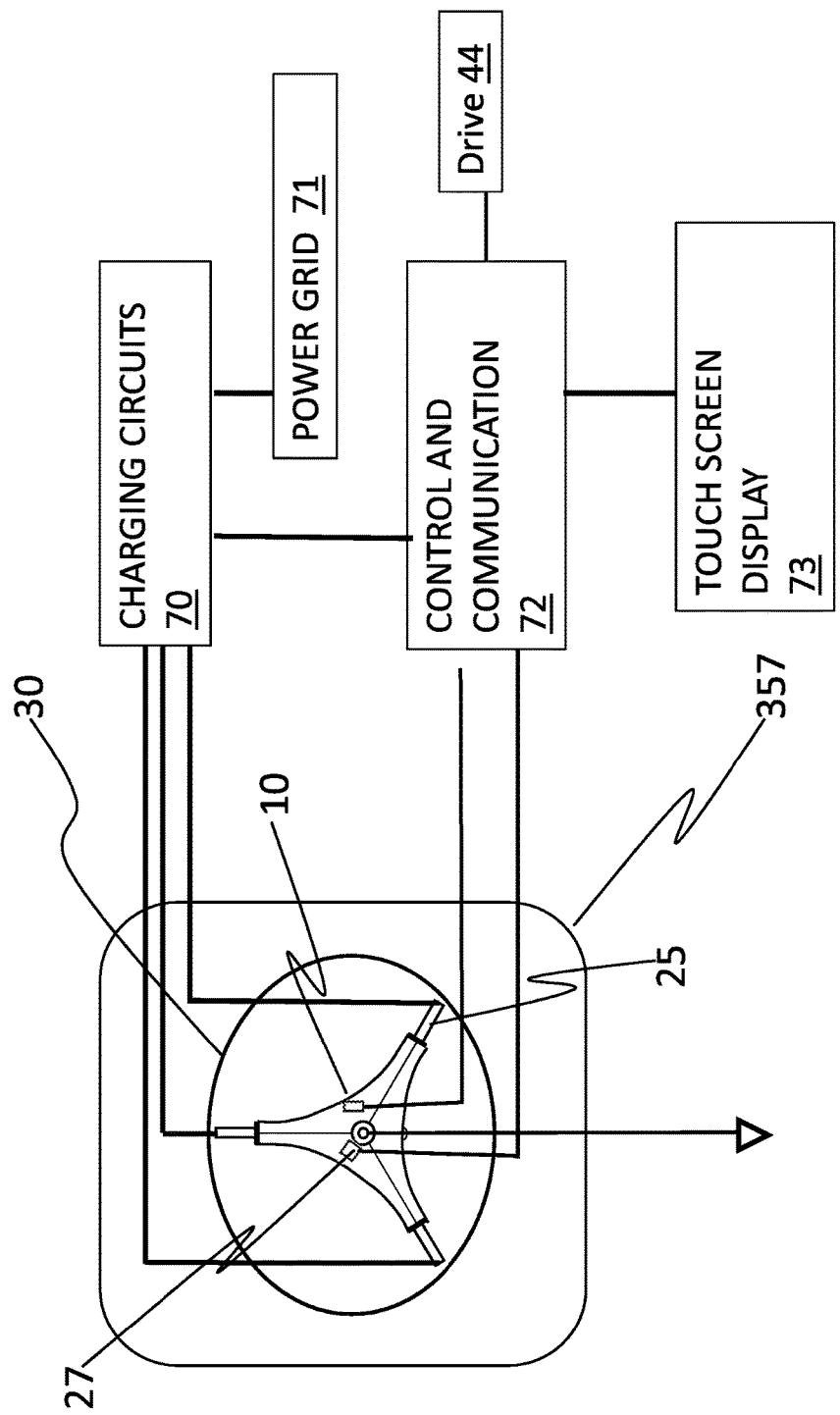
FIG. 7 schematically shows an example of functional circuits electronically coupled to a charging probe installed in a port.

Referring now to FIG. 2, a perspective side view of an example of a charging probe is schematically shown. In addition to the contacts 22, 25, and 27, a portion of an electrical cable bundle 32 is shown. The electrical cable bundle includes insulated conductors (as shown in FIG. 7) for separate electrical connection to each of the contacts. In one example, the optional contact 22 may advantageously comprise a round center ground rod having an exposed portion 22A and an embedded portion 22B aligned along the center axis 11. The ground rod may serve multiple purposes. Besides its use as an electrical ground it may contribute structurally lending strength as the core of the probe body and may help to align the probe and port. For example, the probe may have up to a ½-inch diameter round center ground rod. The exposed portion 22A may be conductive metal with a rounded apex 21. This configuration will allow the function of centering alignment with the probe if initial contact is off center.

Still referring to FIG. 2, the charging probe 10 is shown to include an upper tetrahedral portion 13 and an extended base 17. The base comprises a negatively curved triangle 17 with sides 19 having expanded widths with each side terminating at a generally rectangular face 2. The three power terminals may extend from the probe at the ends of each rectangular face 2. The three power connecting terminals 25 are insulated from each other and the other contacts in and on the probe. The bottom surface 5 of the probe insulating body 3 may be flat.

Figure 6:
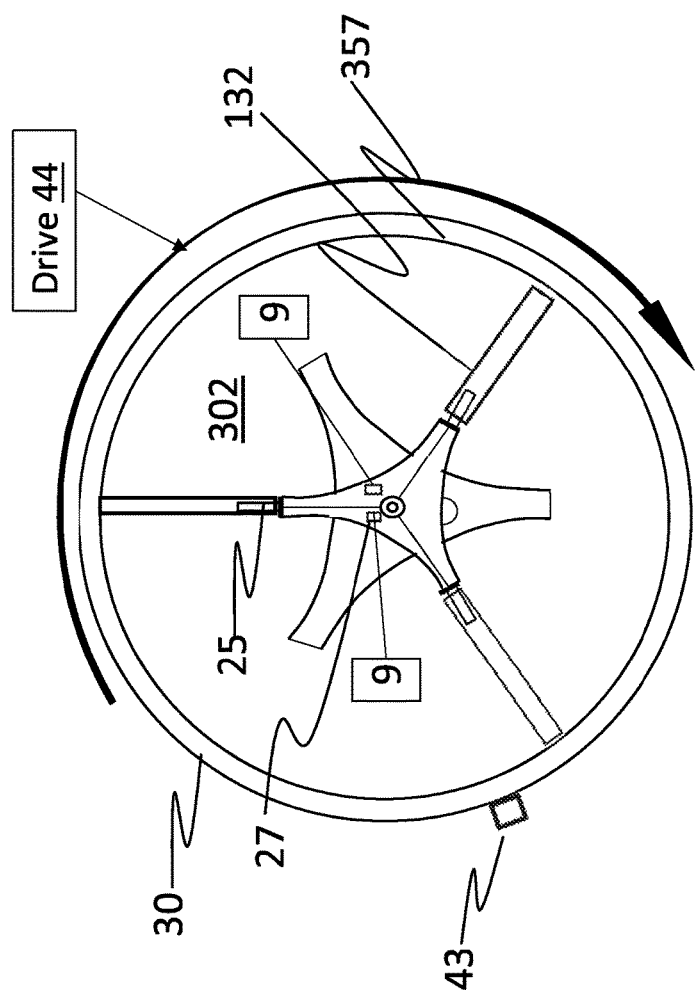
FIG. 6 schematically shows a cutaway rear view of an example of a motorized system suitable for rotatably locking a charging probe into a port alignment and locking ring assembly.

In one useful example, the first plurality of electrical contacts 25 may comprise blades or similar power terminals that radially project from the center axis and may advantageously be offset from each other at oblique angles, such as, for example, at 0°, 120°, and 240°. The radial offset in cooperation with the negatively curved sides allows rotational alignment as well as structural support for the three power connectors. Each terminal blade may be up to about ¼ inch thick and about 1.5 inches deep, with about 1 inch protruding from the insulating body. Thus the exposed contact area of the terminals may be ¼-inch-wide, 1.5 inches deep, and 1 inch in length. The terminals may have rounded leading and trailing edges. The port may advantageously have a center socket shaped to couple to the ground rod. The port may include three power connecting channel contact points 132 (as shown in FIG. 6) to accept and connect with the power terminals of the probe. Power to the port's contacts may be disconnected until such time as proper connectivity is confirmed, for example, by a communication and control system. In the example of a probe in the shape of a negatively curved tetrahedron, each side of the charging probe 10 is bounded by a negatively curved ridgeline 33. The second set of contacts 27 in one example may function as communication contact terminals shaped as pads ¼ wide extending from 0.25 to 1.75 inches from the extreme rear of the insulating body structure.

Figure 3:
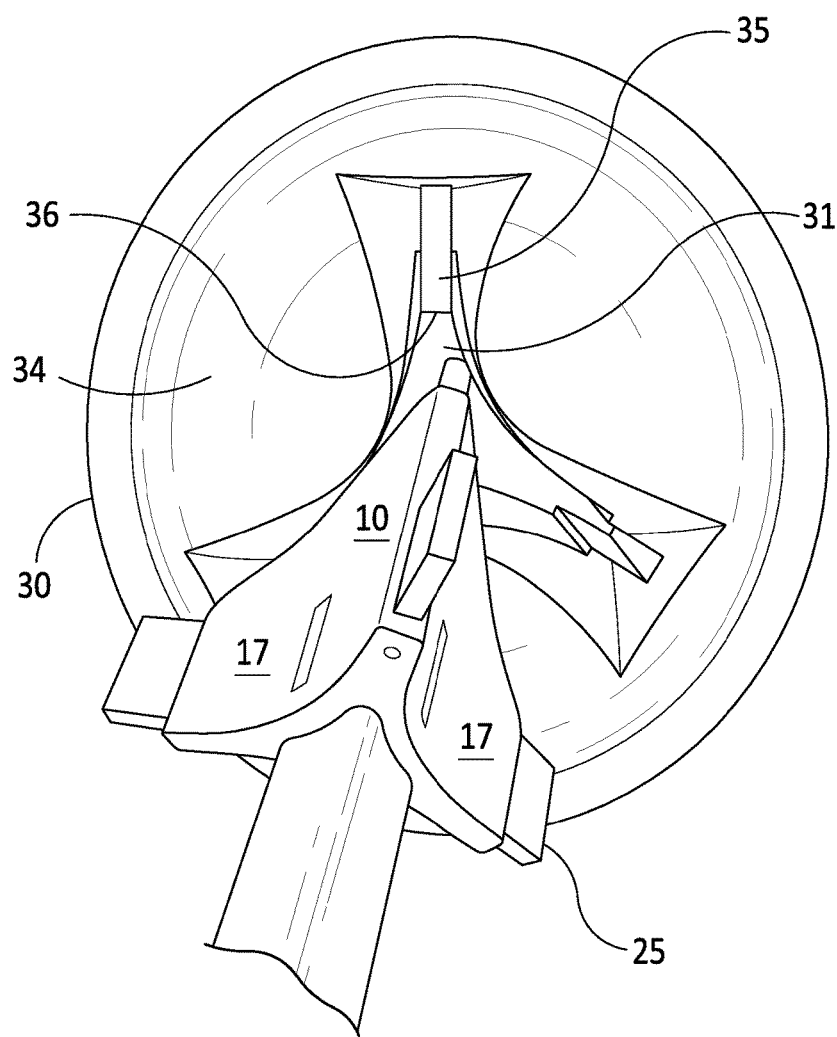
FIG. 3 schematically shows an example of a charging probe prior to insertion into a port alignment and locking ring.

Referring now to FIG. 3, an example of a charging probe prior to insertion into a port is schematically shown. A locking ring 30 includes a generally conical central portion 34 having an aperture 36. The aperture 36 is sized to receive the charging probe 10. In one example, the conical section 34 of the locking ring may be a modified cone with an open face, the apex of which comprises an aperture that constitutes the entrance to a socket connector for the grounding rod. The outer extent of the conical shape may advantageously form a modified funnel that guides the probe ground rod into a central aperture region 31 leading to the ground rod socket (shown below). The modified cone structure may result in a gap between the probe and port which may protect against contact that could lead to the formation of carbon tracing in the presence of water or ice or other foreign object. It may also allow for the presence of some foreign material (i.e. snow or sand) without blocking full docking.

The locking ring 30 may have an open face preferably aligned in a plane that is parallel to or generally coextensive with a defined plane, such as, for example its case or mounting surface. The central portion of the locking ring 30 may correspond in shape to that of the probe's body at its greatest extent. Slots 35 forming the entrance to the sockets for the probe's contacts are constructed to align with the oblique angles of the probe power terminal blades. The slots extend out radially and are long enough to accommodate the probe's power terminals with room for slight misalignment. The outside diameter of the ring 30 may be greater than that of the extent of the probe including the power terminals.

Figure 4:
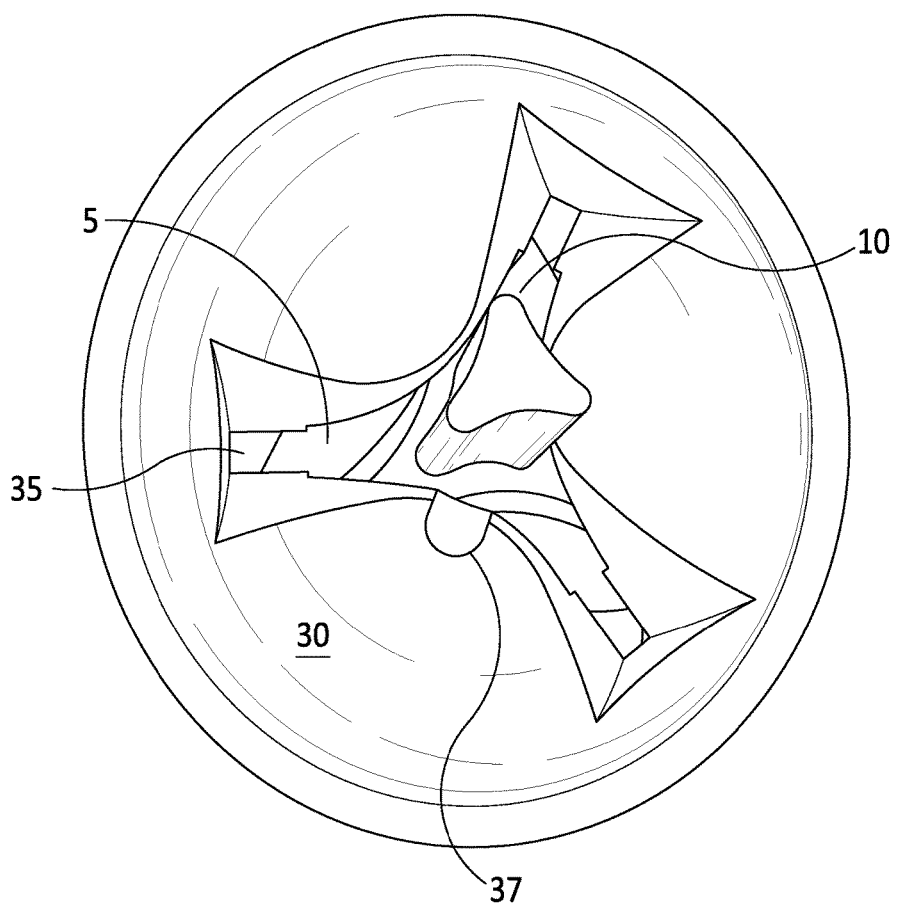
FIG. 4 schematically shows an example of a charging probe after insertion into a port alignment and locking ring that has been rotated into a locked mode.

Referring now to FIG. 4, an example of a charging probe after insertion into a locking ring that has been rotated into a locked mode is schematically shown. Here a charging probe 10 has been fully inserted into and through a locking ring 30 which has been rotated to a locked position in order to capture the charging probe 10 and hold it in place within the port. An inner surface 351 of the locking ring 30 may be flush mounted in or on a port housing or case (as shown and described in more detail with respect to FIG. 5) or directly to the port. The port may contain other locking devices that may confirm correct docking and may hold the probe securely in the port during charging, power supply or other use. In some applications the probe may be fixed to a vehicle either permanently in position in relation to that vehicle, or with devices to move it into position for docking, or the probe may be free of specific attachment to any other equipment, i.e. at the end of a cable bundle. In one example, the probe is locked into the port housing by rotating the ring about 60 degrees thus blocking the exit of the probe power terminals.

Figure 5:
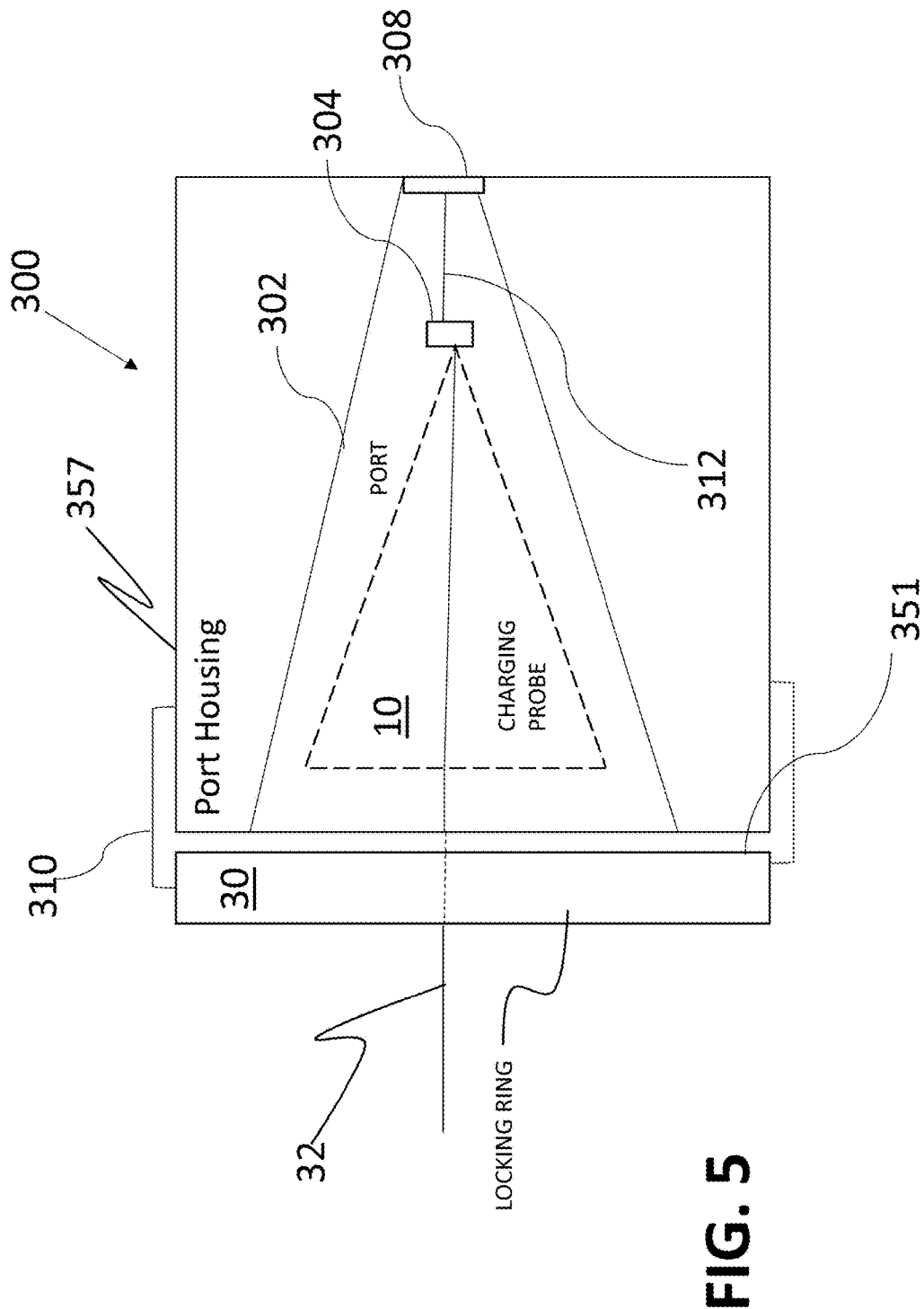
FIG. 5 schematically shows a highly conceptualized example of an alignment and locking ring and port assembly with a connected probe.

Referring now to FIG. 5, a highly conceptualized example of an alignment and locking ring and port assembly with a connected probe is schematically shown. An alignment and locking ring and port assembly 300 includes a port housing 357 containing a port 302 having an input end rotationally coupled to an alignment and locking ring 30 by coupler 310 or a similar conventional connection scheme. The size of the port is constructed to accommodate the outer dimension of the probe's power terminals. Symmetrically placed between the upper and two lower power terminal sockets may be two low voltage flat surface contacts designed to connect to those on the probe and facilitate wired communication between the port and probe. The port 302 optionally includes a ground socket or contact 304 for coupling with the center ground rod 22 of a probe 10 which has been docked in the port 302. Other electrical contacts are also mounted in the port and coupled to corresponding contacts on the probe as shown below. A plurality of conductors 312 transmits electrical signals to and from the ports electrical contacts. The port further includes an interface connector 308 at an output end for coupling with external power lines and other circuits. The alignment and locking ring 30 serves to assist in the alignment of port and probe and facilitate the docking of the probe into the port housing and, further, to lock the probe into the port housing once successfully docked.

Referring now to FIG. 6, a cutaway rear view of an example of a motorized system suitable for rotatably locking a charging probe into a locking ring and port housing is schematically shown. To accomplish locking a probe into a docked position, movement of the locking ring 30 may be driven by a drive 44, such as a stepper motor. In one configuration a stepper motor may be installed with a gear (e.g. a pinion) that engages with a ring gear integral with the locking ring or one attached to it. The motor may be placed in any convenient orientation such as perpendicular or horizontal to the locking ring inner surface. It may be inside or outside of the ring. One or more limiting elements 43 may be mounted to the ring that, for example, contact limiting switches or other stops. Alternately the locking ring may be driven by a linear actuator and connecting mechanism such as a rod, bar or similar device. Limiting devices may be mounted on the locking ring or the extent of the linear actuator's movement may be designed to accurately and consistently bring the port alignment and locking ring 30 into a fully open or fully closed position.

In order to make the electrical connections needed for charging, the port 302 includes a first plurality of power contact channels 132 located at predetermined angles to allow mating with corresponding first plurality of power terminal blades 25 of a charging probe 10. In addition to the power contact channels 132, the port may contain a grounding socket as shown above, and two low power communications contacts 9 adapted to be coupled to the set of probe low power communication contacts 27.

Referring now to FIG. 7, an example of a power and communications circuit electronically coupled to a charging probe installed in a port is schematically shown. A charging probe 10 is shown electrically coupled to a port, within a port housing 357. In this example the first plurality of contacts 25 serve as the power terminals and are connected to the charging circuits 70. The charging circuits are conventionally constructed and coupled to a power grid 71. The second set of contacts 27 serve as communication and control contacts and are coupled to a control and communications circuit 72. The charging circuits 70 are typically located in the electric vehicle, but may also be integrated into a separate charging station, or installed wholly or partially in either a vehicle or a charging station. The control and communication circuits 72 may be similarly located inside of a charging station, separate housing or be integrated wholly or partially into a vehicle's electronics. A touch screen display 73 may be provided for operator notifications and interaction. An operator may provide input signals through an interface such as the touch screen on the display or other conventional means. Other configurations for these functions may also be used for particular applications. If the locking ring is mechanized, the control and communication circuits may also provide activation and control signals to the drive 44.

The port housing may advantageously be constructed of material that provides electrical insulation as well as housing the electrical contacts or sockets and associated electrical power cabling and communication wires. The port itself may have a protective cover to protect the port from the elements, vandalism, or unintended or accidental use. The control and communication circuits may negotiate with conventional port or vehicle electronics to transmit or receive signals representing physical parameters (i.e. giving location information for the particular vehicle or equipment to which a probe or port may be attached). The parameters may include power requirements (i.e. voltage type and amount, current amount). These power requirements may change during use. The parameters may also include identification data, which may be used for management, security, tracking, billing, or any other use. The probe may include electronics equipped to communicate wirelessly giving parameters acceptable for the particular vehicle or equipment to which it may be attached. The port may have capacity for wired communication via the second set of contacts. The port or ports may be affixed to a support and may adjust horizontally and vertically as well as in orientation up to 15 degrees in any direction (this adjustment may be passive or active) or the port may be free of specific attachment to any other fixed equipment, i.e. at the end of a cable bundle. The second set of contacts may support proprietary or standardized communications (i.e. Tesla's supercharging system, SAE J1772, CHAdeMO, etc.). This connectivity and communication may be used for legacy support. These contacts may also be used to confirm connectivity and identity.

Figure 8:
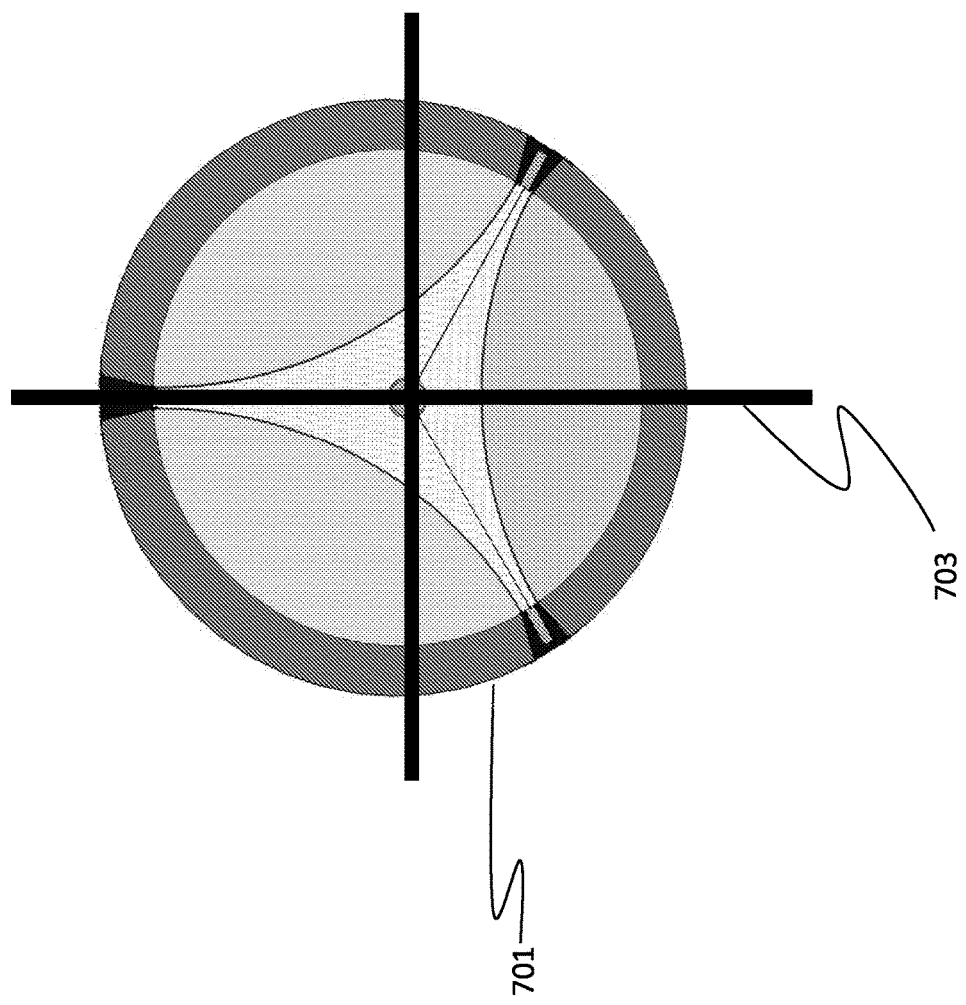
FIG. 8 schematically shows an example of a target icon suitable for alignment of a charging probe with a locking charging port.

Referring now to FIG. 8, an example of a target icon suitable for alignment of a charging probe with a charging port is schematically shown. The probe on the vehicle or other device may be equipped with devices projecting a reticle such as crosshairs 703 whose convergence may point to the resting point of the probe should the current trajectory be continued, thus facilitating docking by allowing the operator or automated equipment to guide the vehicle or other device into the port by placing the convergence of the lines on the center of the port by locating the crosshairs on a target icon 703, for example. Before docking the probe may communicate with the port (docking station) wirelessly to set the height, and offset from center for the port. This may allow adaptation for vehicles or equipment that do not have a symmetrically centered probe allowing said equipment to center into a parking space regardless of its probe's relative position. The shape of the port and a pattern of lines or shapes may form a unique overall pattern which may be recognized by human or electronic devices.

Figure 9:
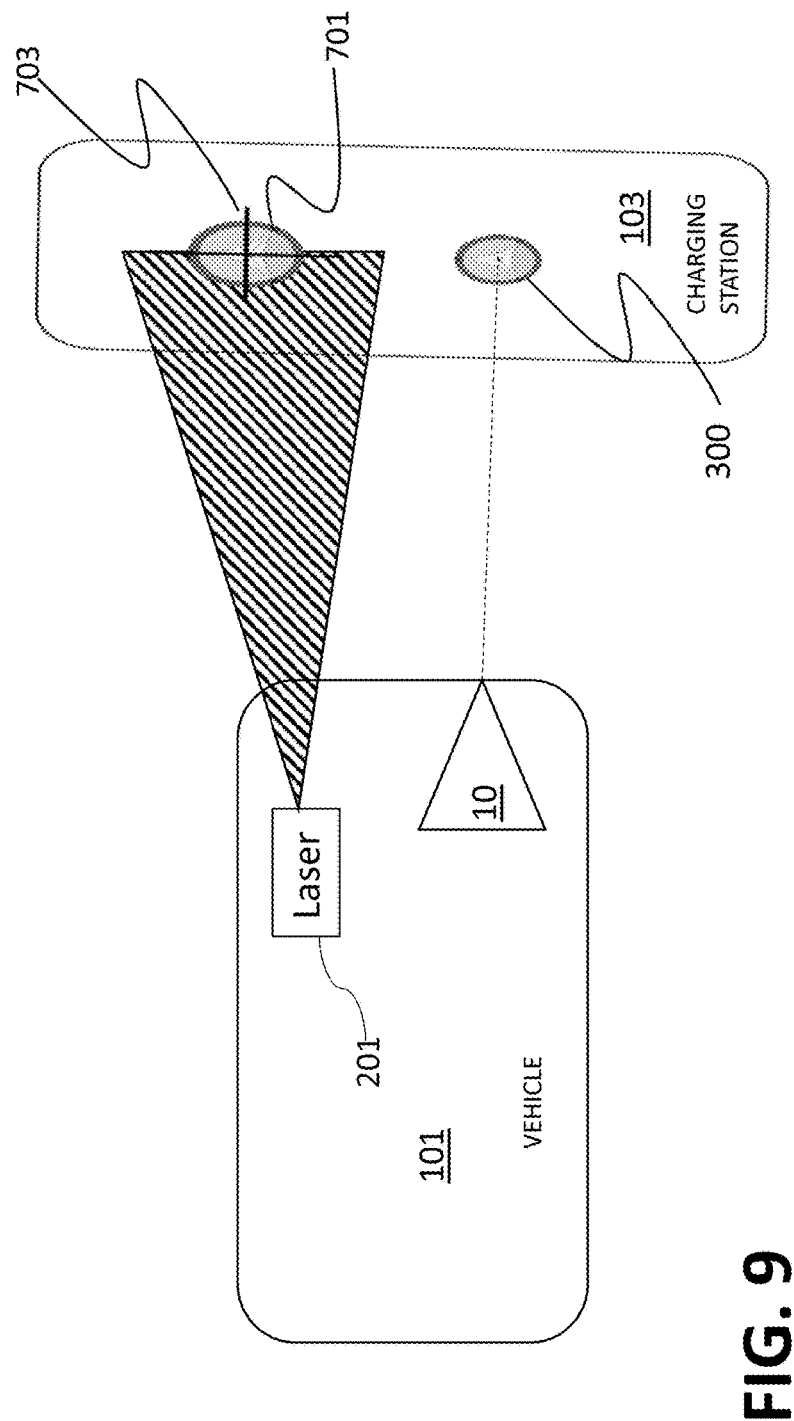
FIG. 9 schematically shows an operational example of a vehicle aligning to a port.

Referring now to FIG. 9, an operational example of a vehicle aligning to a port is schematically shown. A vehicle 101 includes a projection device 201, such as, for example, a laser, conventionally configured to project a reticle such as crosshairs 703 onto a target icon 701. The target icon is located so as to align a locking ring and port assembly 300 with a probe 10 when the crosshair is centrally positioned on the target. Of course other similar projection and icon schemes may also be employed.

Figure 10:
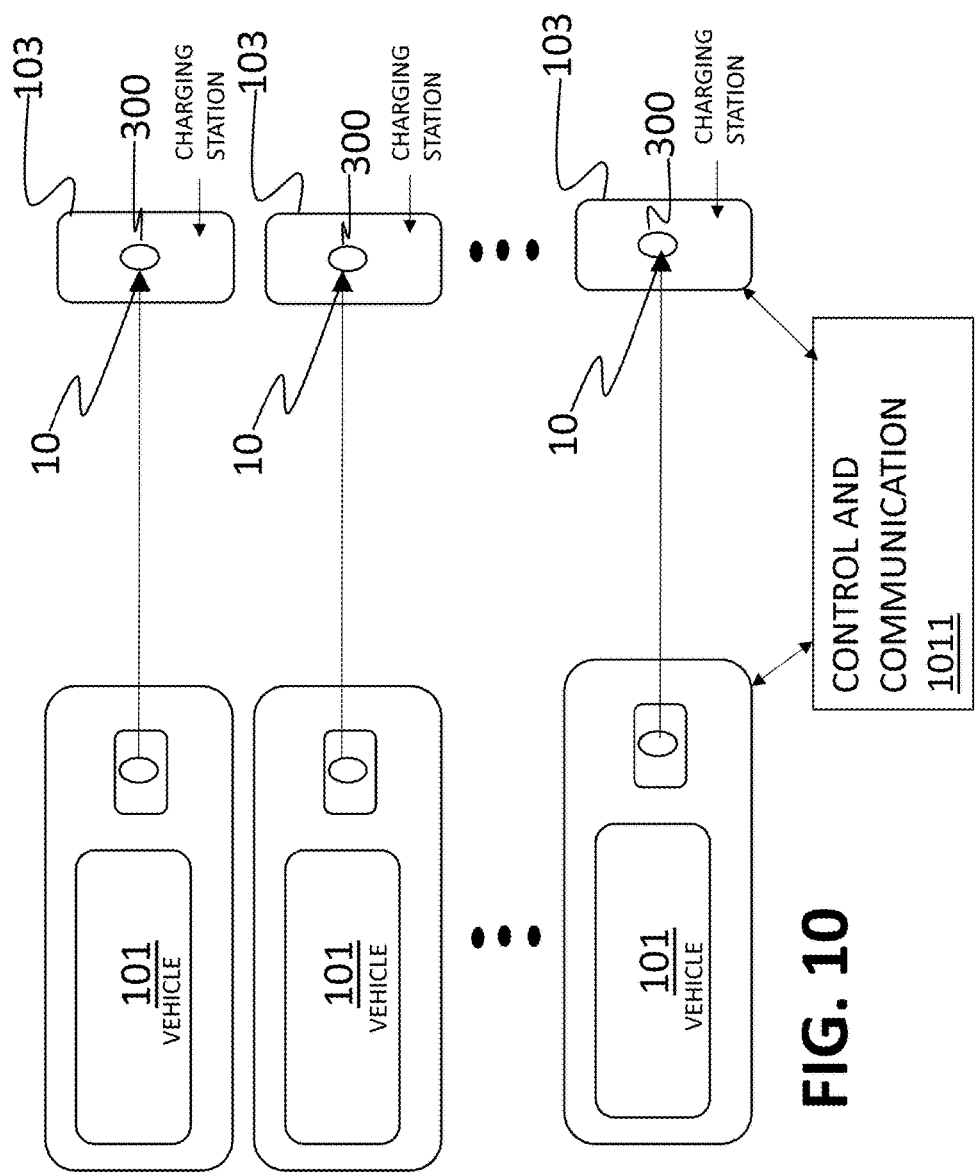
FIG. 10 schematically shows an example of a multiple port management and communications system.

Referring now to FIG. 10, an example of a multiple port management and communications system is schematically shown. A control and communications system 1011 communicates with multiple alignment rings and port assemblies 300 mounted in charging stations 103 and multiple vehicles 101 to allow intelligent management of a set of ports. It may allow queuing of vehicles balancing the available time for charging with available matching spaces, immediate or scheduled. This system may have a special unique visual symbol that may be used to signal the existence of a managed set of power docking ports. The vehicle may communicate wirelessly with this system for identification, power capacities, and the number, locations, and capacities of available ports may then be supplied. The vehicle or other equipment may then, either autonomously or using a human driver, move to and make contact with the first available compatible port.

Figure 11:
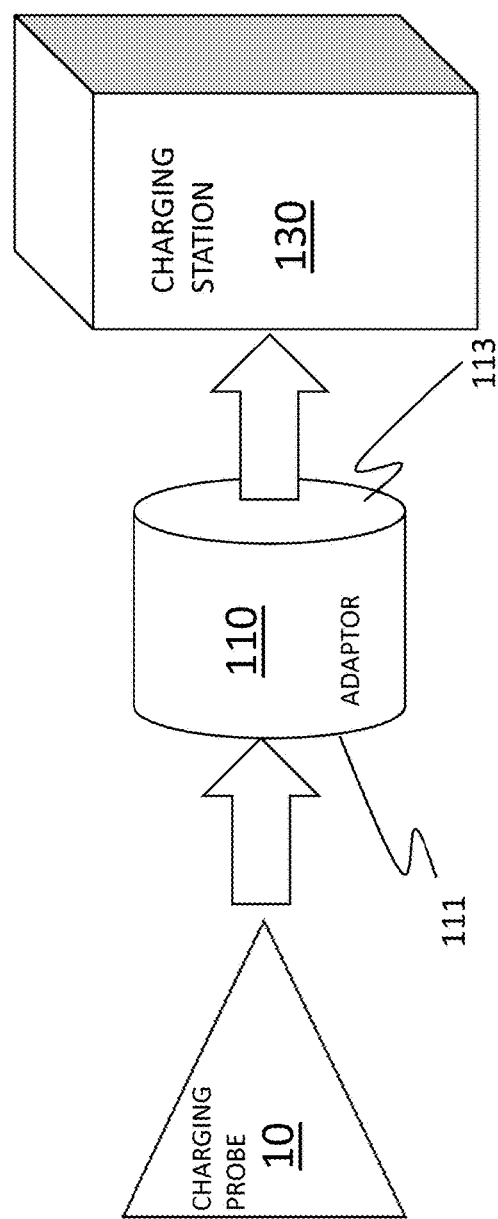
FIG. 11 schematically shows an example of an adaptor for a probe to connect to existing standard charge stations.

Referring now to FIG. 11, an example of an adaptor for a probe to connect to existing standard charge stations is schematically shown. A charging probe 10 may be fitted with a mating adaptor 110 which has one end 111 configured as a mating port to accept the charging probe 10 and the second end 113 adapted to fit into a selected existing charging station 130 of a different configuration from the charging probe. Adaptors may be created to make physical connections from a probe to an existing cable type, i.e. CHAdeMO or proprietary system such as Tesla's. Communications may also be translated from the probe's wired or wireless communication to the legacy communication standard. These adaptors may terminate with a cable or a plug for a cable. These adaptors may be made to lock onto the probe. Adaptors may be created to make physical connections from the port to an existing cable type, i.e. CHAdeMO or proprietary system such as Tesla's Supercharger. Communications may also be translated from the port's wired or wireless communication to the legacy communication standard. These adaptors may terminate with a cable or a plug for a cable. These adaptors may be made to lock into the port.

Figure 12:
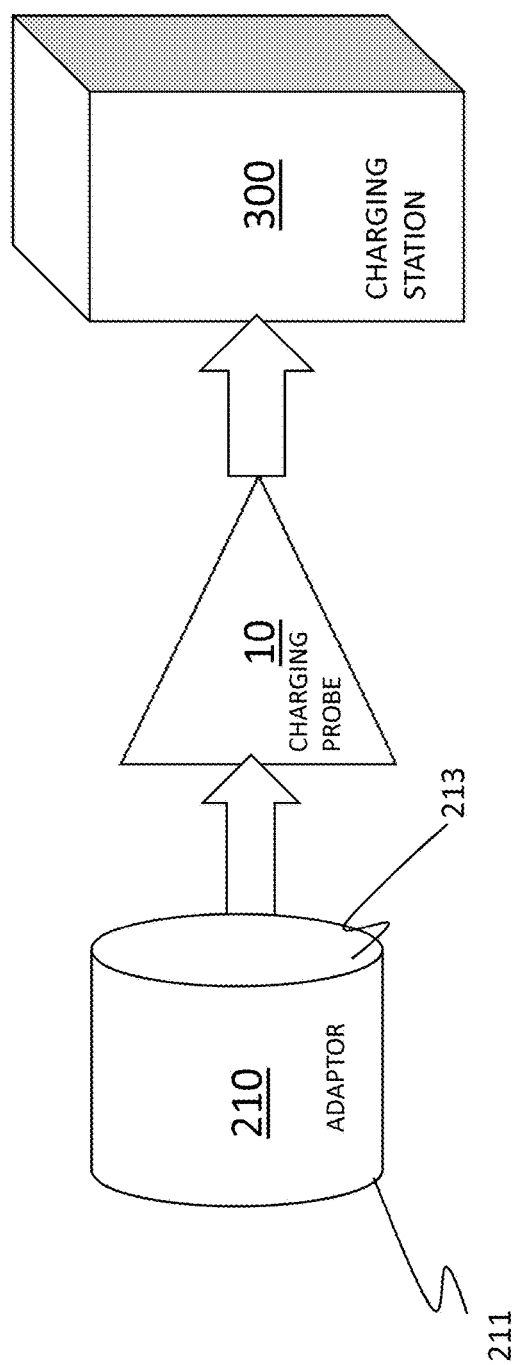
FIG. 12 schematically shows an example of an adaptor for an existing connector to connect to a charging port configured as disclosed herein.

Referring now to FIG. 12, an example of an adaptor for a conventional or other selected connector to connect to an alignment locking ring and port assembly is schematically shown. A mating adaptor 210 has an input end 211 configured as a standard port to accept a conventional connector and an output end 213 adapted to be fitted with a charging probe 10. Thus a vehicle with a conventional charging plug can be adapted to fit into the charging system as disclosed herein using an alignment and locking ring and port.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by different equipment, and devices, and that various modifications, both as to the equipment details and operating procedures, may be accomplished without departing from the true spirit and scope of the present invention.

What is claimed is:

1. A power docking port system comprising:
   a charging probe having a substantially tetrahedral shape with multiple sides and a base portion, each of the multiple sides having a surface;
   a first plurality of contacts embedded into the charging probe wherein each of the first plurality of contacts extends radially outwardly from the base portion disposed at a predetermined angle from the others;
   a second set of contacts, wherein each of the second set of contacts is mounted onto a different one of the multiple sides so as to conform with its surface;
   a port adapted for use in direct current charging of electronic vehicles wherein the port is constructed to mate with the charging probe and the port includes a plurality of mating contacts for individually coupling with each of the first plurality of contacts and second set of contacts on the charging probe; and
   wherein the port further includes an interface connector located at an output end of the port for electrically coupling with external power lines and other circuits.

2. The power docking port system of claim 1 wherein the charging probe has an upper portion comprising a negatively curved tetrahedron.

3. The power docking port system of claim 2 where the base comprises a negatively curved triangle with sides having expanded widths and where each side terminates at a generally rectangular face.

4. The power docking port system of claim 1 further comprising a ground contact embedded in the charging probe.

5. The power docking port system of claim 1 further comprising an alignment mechanism.

6. The power docking port system of claim 1 wherein the charging probe has a central axis and the first plurality of electrical contacts comprise power terminals radially projecting from the center axis and offset at oblique angles.

7. The power docking port system of claim 6 where the first plurality of electrical contacts are offset from each other at 0°, 120°, and 240°.

8. The power docking port system of claim 6 wherein the port has an input end that is rotatably connected to one end of an alignment and locking ring and the size of the port is constructed to accommodate the outer dimension of the power terminals.

9. The power docking port system of claim 8 wherein the alignment and locking ring includes a generally conical central portion having an aperture with radial slots sized to receive the charging probe when inserted and wherein the conical shape serves to assist in the alignment of port and probe and facilitate the docking of the probe into the port.

10. The power docking port system of claim 8 further comprising a bi-directional drive coupled to the alignment and locking ring and adapted to rotate the alignment and locking ring into a locked mode and reversibly rotating the alignment and locking ring into an open mode.

11. The power docking port system of claim 10 wherein the bi-directional drive comprises a stepper motor.

12. The power docking port system of claim 1 wherein the charging probe is fixed to a vehicle.

13. The power docking port system of claim 1 wherein the port includes a ground contact adapted for coupling with a center ground rod of a probe.

14. The power docking port system of claim 1 further comprising a control and communications circuit adapted to be electronically coupled to the charging probe when installed in a port.

15. The power docking port system of claim 14 further comprising a display adapted for operator notifications and interaction.

16. The power docking port system of claim 10 further comprising:
a control and communications circuit adapted to be electronically coupled to the charging probe when installed in a port; and
wherein the control and communication circuit is coupled to provide control signals to the bi-directional drive.

17. The power docking port system of claim 14 wherein the control and communication circuit is adapted to transmit or receive signals representing physical parameters to the vehicle and/or port.

18. A power docking port system comprising:
a charging probe electrically coupled to a vehicle having a substantially tetrahedral shape with multiple sides and a base portion, each of the multiple sides having a surface;
a first plurality of contacts embedded into the charging probe wherein each of the first plurality of contacts extends radially outwardly from the base portion disposed at a predetermined angle from the others;
a second set of contacts, wherein each of the second set of contacts is mounted onto a different one of the multiple sides so as to conform with its surface;
a port adapted for use in direct current charging of electronic vehicles wherein the port is constructed to mate with the charging probe and the port includes a plurality of mating contacts for mating with each of the first plurality of contacts and second set of contacts on the charging probe;
wherein the port further includes an interface connector located at an output end of the port for electrically coupling with external power lines and other circuits;
a charging station located externally to the vehicle;
a target icon located on the charging station for alignment of the charging probe with a locking charging port; and
wherein the target icon is located to receive a projected reticle so as to allow guiding the vehicle into the port when the reticle is projected on a predetermined location on the target icon.

19. The system of claim 18 wherein the probe includes communication apparatus for wirelessly communicating with the port.

20. The system of claim 18 further comprising a projection device mounted on a vehicle adapted to project the reticle.

21. A multiple port management and communications system comprising:
a control and communications system adapted to communicate with multiple alignment ring and port assemblies mounted in charging stations wherein each alignment ring and port assembly includes:
a port adapted for use in charging of electronic vehicles wherein the port has an input end, is adapted to mate with a charging probe inserted, locked and docked into the port through the input end and the port includes a plurality of mating contacts;
wherein the port further includes an interface connector located at an output end of the port for electrically coupling with external power lines and other circuits;
wherein the mating charging probe includes a body having a substantially tetrahedral shape with multiple sides and a base portion, each of the multiple sides having a surface, a first plurality of contacts embedded into the charging probe wherein each of the first plurality of contacts extends radially outwardly from the base portion disposed at a predetermined angle from the others, and a second set of contacts, wherein each of the second set of contacts is mounted onto a different one of the multiple sides so as to conform with its surface;
wherein the port further includes contacts for coupling to each of the first plurality of contacts and second set of contacts on the charging probe when the probe is locked and docked into the port; and
an alignment and locking ring is rotatably attached to the port.

22. The system of claim 21 wherein the control and communications system is adapted to communicate with multiple vehicles and so as to allow queuing of vehicles and balancing the available time for charging with available matching spaces.

23. The system of claim 22 where each vehicle is adapted to communicate wirelessly with the control and communications system to transmit and receive information selected from the group consisting of identification, and power capacities, and the number, locations, and capacities of available ports.

24. An adaptor to connect a charging probe to a selected charging port of a different configuration comprising:
a charging probe fitted with a mating adaptor which has one end configured as a mating port to accept the charging probe and the second end adapted to fit into an existing charging station;
wherein the charging probe includes an insulated body having a substantially tetrahedral shape with multiple sides and a base portion, each of the multiple sides having a surface, a first plurality of contacts embedded into the charging probe wherein each of the first plurality of contacts extends radially outwardly from the base portion disposed at a predetermined angle from the others, and a second set of contacts, wherein each of the second set of contacts is mounted onto a different one of the multiple sides so as to conform with its surface; and
wherein the adaptor includes an input end conformed to mate with the charging probe and an output end conformed to mate with the selected charging port.

25. An adaptor for coupling a selected connector to a charging probe wherein the charging probe includes an insulated body having a substantially tetrahedral shape with multiple sides and a base portion, each of the multiple sides having a surface, a first plurality of contacts embedded into the charging probe wherein each of the first plurality of contacts extends radially outwardly from the base portion disposed at a predetermined angle from the others, and a second set of contacts, wherein each of the second set of contacts is mounted onto a different one of the multiple sides so as to conform with its surface, the adaptor comprising:
an input end configured as a port configured to accept the selected connector; and
an output end adapted to be fitted with the charging probe.

* * * * *